United States Patent
Chan (10) Patent No.: US 10,759,071 B2
(45) Date of Patent: Sep. 1, 2020

(54) CULINARY CHIPPING, SLICING AND DICING TOOL

(71) Applicant: Maxpat Trading & Marketing (Far East) Ltd., Tsimshatsui, Kowloon (HK)

(72) Inventor: Shu Tong Chan, Tai Po (HK)

(73) Assignee: Maxpat Trading & Marketing (Far East) Ltd., Tsimshatsui, Kowloon (HK)

( * ) Notice: Subject to any disclaimer, the term of this patent is extended or adjusted under 35 U.S.C. 154(b) by 20 days.

(21) Appl. No.: 16/344,219

(22) PCT Filed: Nov. 14, 2017

(86) PCT No.: PCT/CN2017/110838
§ 371 (c)(1),
(2) Date: Apr. 23, 2019

(87) PCT Pub. No.: WO2018/086621
PCT Pub. Date: May 17, 2018

(65) Prior Publication Data
US 2019/0255723 A1    Aug. 22, 2019

(30) Foreign Application Priority Data

Nov. 14, 2016 (HK) .................................... 16113067

(51) Int. Cl.
*B26D 3/18* (2006.01)
*B26D 3/26* (2006.01)
(Continued)

(52) U.S. Cl.
CPC .............. *B26D 3/185* (2013.01); *A47J 43/25* (2013.01); *B26D 3/18* (2013.01); *B26D 3/26* (2013.01);
(Continued)

(58) Field of Classification Search
CPC .... B26D 3/26; B26D 7/0608; B26D 2210/02; B26D 3/20; B26D 3/18; B26D 3/185; B26D 3/22
(Continued)

(56) References Cited

U.S. PATENT DOCUMENTS 2,353,607 A * 7/1944 Young .................... B26D 3/185
83/404.2
6,805,032 B2 10/2004 Engdahl
(Continued)

FOREIGN PATENT DOCUMENTS

CN           2730585 Y     10/2005
CN         103302695 A      9/2013
(Continued)

OTHER PUBLICATIONS

International Search Report of PCT/CN2017/110838, dated Feb. 14, 2018.

*Primary Examiner* — Kenneth E Peterson
*Assistant Examiner* — Sina A. Shayan
(74) *Attorney, Agent, or Firm* — Leydig, Voit & Mayer, Ltd.

(57) ABSTRACT

A culinary tool for slicing and dicing, includes a base connected by a hinge to a frame that carries two cutting grids. A drive mechanism connects a pivoting handle to a pusher such that pivoting of the handle relative to the frame drives displacement of the pusher and the turning of the frame between the open and closed positions, and a forward stroke turns the frame about the hinge toward the base, pressing the item through the first cutting grid, and a reverse stroke moves the pusher to the one of the ends of the cavity, pressing the item through the second cutting grid.

11 Claims, 5 Drawing Sheets

(51) Int. Cl.
*A47J 43/25* (2006.01)
*B26D 7/01* (2006.01)
*B26D 7/06* (2006.01)

(52) U.S. Cl.
CPC ............ *B26D 7/01* (2013.01); *B26D 7/065* (2013.01); *B26D 7/0608* (2013.01); *B26D 2210/02* (2013.01)

(58) Field of Classification Search
USPC ......................................................... 83/858
See application file for complete search history.

(56) References Cited

U.S. PATENT DOCUMENTS

| | | | |
|---|---|---|---|
| 7,587,968 B1 * | 9/2009 | Roberts | B26D 3/185 83/404.3 |
| 8,640,587 B2 | 2/2014 | Cheung et al. | |
| 9,302,403 B2 * | 4/2016 | Neare-Vaarmann | B26D 7/0608 |
| 2011/0283551 A1 | 11/2011 | So | |

FOREIGN PATENT DOCUMENTS

| CN | 105313160 A | 2/2016 |
|---|---|---|
| GB | 417975 A | 10/1934 |

* cited by examiner

CULINARY CHIPPING, SLICING AND DICING TOOL

TECHNICAL FIELD

The present invention relates to a culinary tool that both slices and dices food, such as vegetables, fruit, and cheese.

BACKGROUND OF THE INVENTION

Dicing manually involves making parallel cuts in three sets, the cutting directions of each set being orthogonal. To produce cubes, the spacing of cuts must be even and, if using a knife, the item to be cut must be turned at least once, so culinary hand tools continue to maintain a place in many kitchens, despite the proliferation of electrically powered food processors, because of their capacity to perform tasks such as dicing.

U.S. Pat. No. 7,587,968 describes a culinary hand tool including two orthogonal cutting grids through which an item is pressed sequentially to dice it into cubes: a first cutting grid that is upright and has square openings and a second that is horizontal with rectangular openings. A pivoting handle drives a horizontal pusher to press the item through the first grid and, with continued turning, the handle then abuts a vertical pusher that pushes the item (now cut into strips) down through the second cutting grid.

Although the above culinary tool is generally suitable for dicing and slicing, it has a number of drawbacks. Firstly, to free the path for diced product to drop out, the tool must be mounted so that the second cutting grid projects from the edge of a bench, or a like support, on which the tool rests. Further, the tool itself is quite complicated, with the second pusher and associated guides and return springs not only adding to manufacturing cost but also making cleaning and reassembly time consuming. In addition, near the end of the horizontal pusher's stroke, both the horizontal and vertical pushers advance at the same time, and so this tends to increase the torque that the user must apply via the handle, stresses the blades of the second cutting grid, and tends to cause binding when cutting hard items. Accordingly, there remains room for improvement in the area of culinary tools that process food materials, that are easy to operate, and that are relatively uncomplicated for low cost and ease of operation and cleaning.

DISCLOSURE OF THE INVENTION

According to one aspect of the present invention there is provided a culinary tool comprising:

a base having a support surface for supporting an item to be cut;

a frame defining a cavity having opposing ends;

a hinge connecting the frame to the base to turn between an open position in which the frame and base are spaced apart, and a closed position in which the frame rests on the base;

a first cutting grid disposed on the frame substantially opposite the support surface to bound the cavity, such that turning the frame to the closed position can press the item through the first cutting grid into the cavity;

a second cutting grid on the frame at one of the ends of the cavity;

a pusher attached to the frame for displacement between another of the ends of the cavity for pressing the item through the second cutting grid;

a handle connected by a pivot to the frame for movement through forward and reverse strokes of a single cycle;

a drive mechanism connecting the handle to the pusher such that pivoting of the handle relative to the frame drives the displacement of the pusher and the turning of the frame between the open and closed positions;

wherein the forward stroke turns the frame about the hinge toward the base while holding the pusher to the other of the ends of the cavity, pressing the item through the first cutting grid, and the reverse stroke moves the pusher to the one of the ends of the cavity, pressing the item through the second cutting grid.

Preferably the cavity has a cavity opening opposite the first cutting grid. In the closed position the cavity opening may be uppermost, allowing an item to be cut to dropped into the cavity through the cavity opening.

Preferably the frame comprises parallel, opposing sidewalls elongated longitudinally to extend between the opposing ends of the cavity.

Preferably each sidewall includes a slot, the slots being aligned longitudinally, the pusher having two protrusions, each protrusion received in a respective one of the slots for guiding the displacement of the pusher.

Preferably drive mechanism comprises at least one link pivotally fixed at opposing ends to the pusher and the handle. Alternatively, in place of a slider-crank mechanism the drive mechanism may comprise other types of mechanism that convert between rotary motion liner motion, such as a rack and pinion, for instance.

Preferably the handle is elongate and includes first and second opposing ends, a grip at the first end, and the at least one link pivotally fixed to the second end.

Preferably the at least one bar comprises a pair of bars, each bar pivotally fixed at one end to a respective one of the protrusions on the pusher, and fixed at the other end to the handle.

Preferably the handle comprises a pair of arms, and the at least one link comprises a pair of like links, the grip spans transversely between the arms, the pivot comprises coaxial fasteners that connect intermediate parts of each arm to the frame, and the second end of each arm is pivotally fixed to a respective one of the pair of like links.

Preferably the hinge and the pivot are disposed at longitudinally opposing ends of the frame.

Preferably a suction cup assembly is mounted in a recess in the base for securing the culinary tool to a planar surface. Preferably the suction cup assembly comprises a suction cup having a periphery generally disposed in a cup plane offset below a lowermost face of the base, a slot fixed to a central part of the suction cup, and a rotary actuator having an eccentric, wherein the eccentric is received in the slot, such that rotation of the rotary actuator displaces the central part of the suction cup perpendicular to the cup plane.

This invention provides a device which is effective and efficient in operational use, and which can be readily mounted at any location on a bench. Moreover, it has an overall simple design which minimizes manufacturing costs.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

Figure 1:
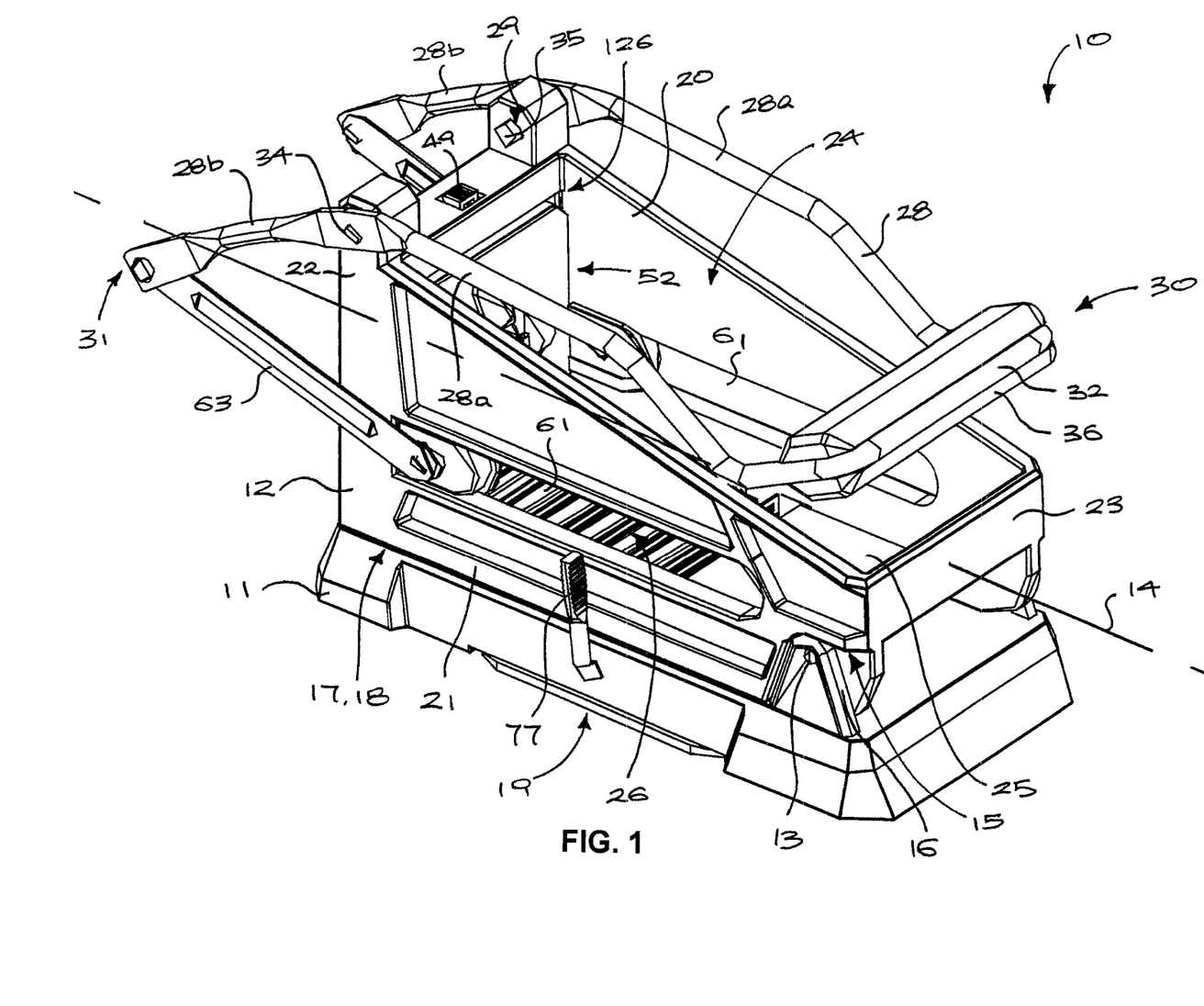
FIG. 1 is a perspective view of a culinary tool according to the invention.
Figures 5, 6:
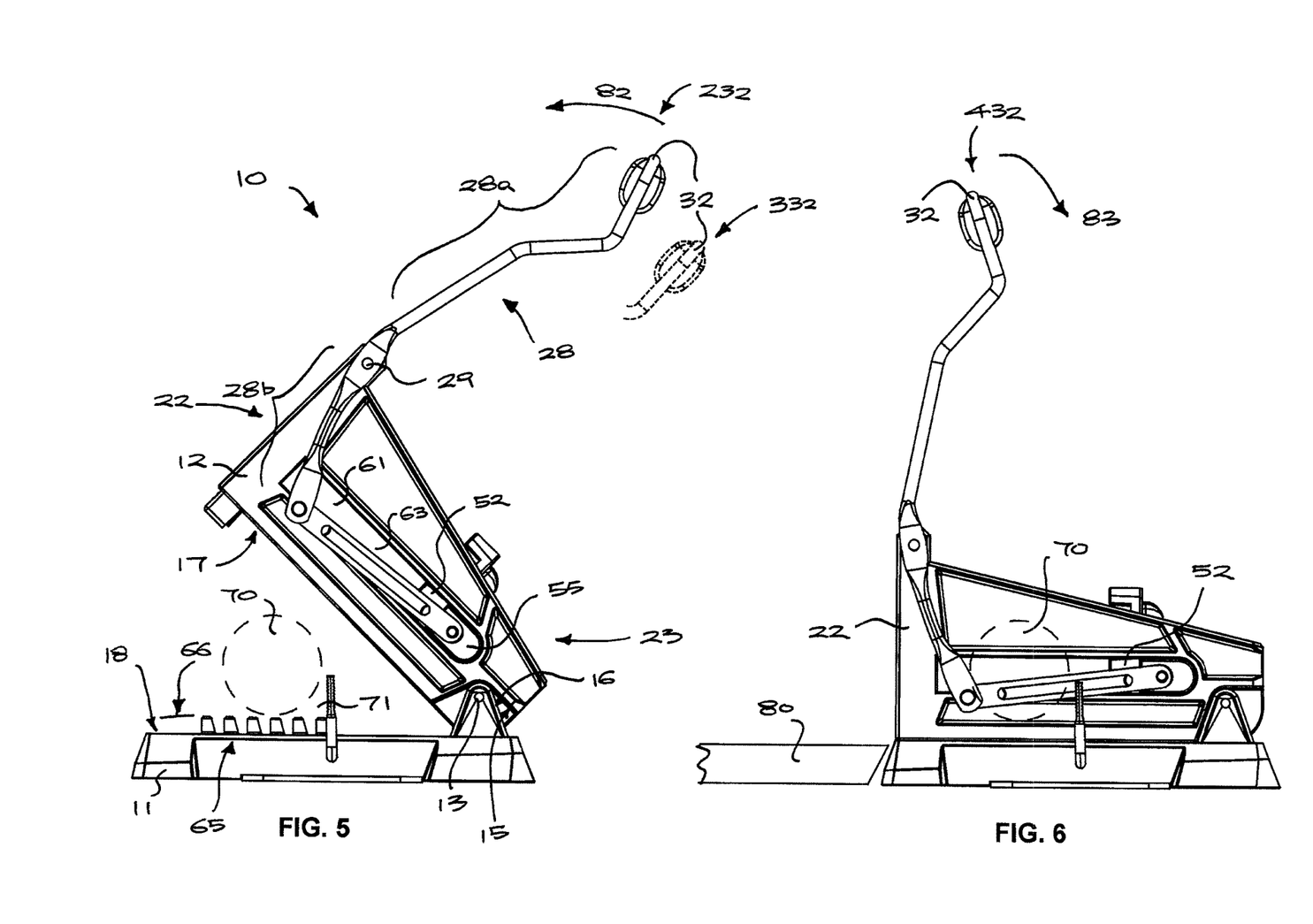
FIGS. 5 and 6 are side views of the culinary tool of FIG. 1 illustrating consecutive steps in a dicing operation

Referring to FIGS. 1 and 5, a culinary tool 10 generally comprises a base 11 connected to a frame 12 by a hinge 13 to turn between an open position (FIG. 5) in which the frame 12 and base 11 are spaced apart, and a closed position (FIG. 1) in which the frame 12 rests on the base 11.

The frame 12 may have a generally rectangular prismatic form, with a long axis 14 orthogonal to the transverse axis of the hinge 13, the hinge 13 being disposed near one longitudinal end of the frame 12 and base 11. Stop surfaces 15, 16 on the frame and base, respectively, may abut to limit the relative angle of rotation about the hinge 13 in the direction of opening and provide a stable inclined position for the frame 12. Complementary surfaces 17, 18 on the frame and base, respectively, may abut in the closed position, whereby the frame 12 is supported on the base 11 with the axis 14 horizontal. A suction cup assembly 19 may be mounted in a centrally located recess in the base 11 for securing the culinary tool 10 to a planar surface, such as a bench top, and is described below in more detail, with reference to FIG. 4.

Opposing sidewalls 20, 21 may be parallel and elongated longitudinally to extend between the opposite ends 22, 23 to surround sides of a cavity 24 in the frame 12. At the hinge end 23 proximate the hinge 13, the cavity 24 may be bounded at its lower side by a floor 25. Adjacent to, and approximately coplanar with the floor 25, a first cutting grid 26 may be provided. A second cutting grid 27 may be provided at the end 22 (opposite the hinge end 23). A cavity opening 126 opposite the first cutting grid 26 and floor 25 may be circumscribed by the sidewalls 20, 21 and ends 22, 23. In the closed position the cavity opening 126 may be uppermost, allowing an item 70 to be cut to dropped into the cavity 24 through the cavity opening 126.

The culinary tool 10 further comprises a handle 28 connected to the frame 12 near the end 22 (opposite the hinge end 23) by a pivot 29, also having a transverse axis. The handle 28 may be elongated between opposite ends 30, 31. The pivot 29 is located at an intermediate position such that the handle 28 extends either side of the pivot 29, comprising a pair of like arms 28a, 28b, each with a relatively long part 28a on one side of the pivot 29, and a shorter part 28b on the other side of the pivot 29. At the end 31 the arms 28a, 28b are joined by a transverse part 32 to which a handgrip 36 may be fixed. The pivot 29 may comprise coaxial fasteners 34, 35 that connect intermediate parts of each arm 28a, 28b to the frame 12.

Figure 2:
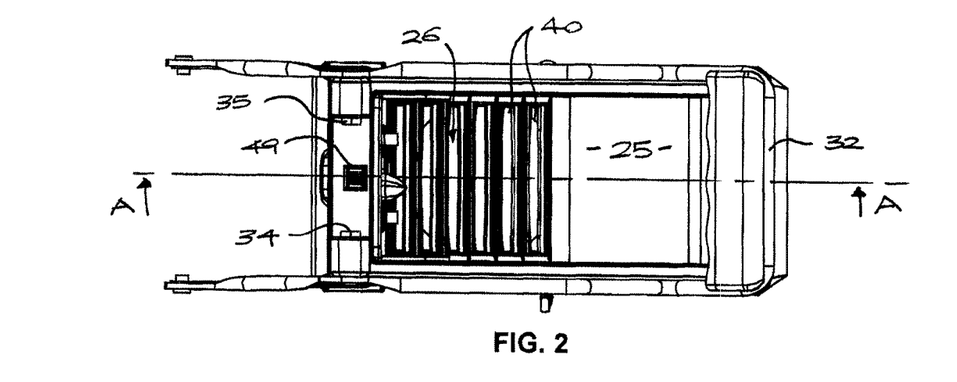
FIGS. 2 and 3 are plan and end views, respectively, of the culinary tool of FIG. 1.
Figure 3:
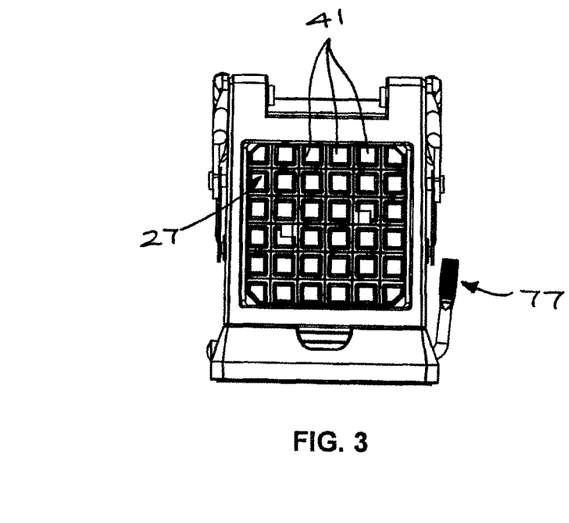
Figure 4:
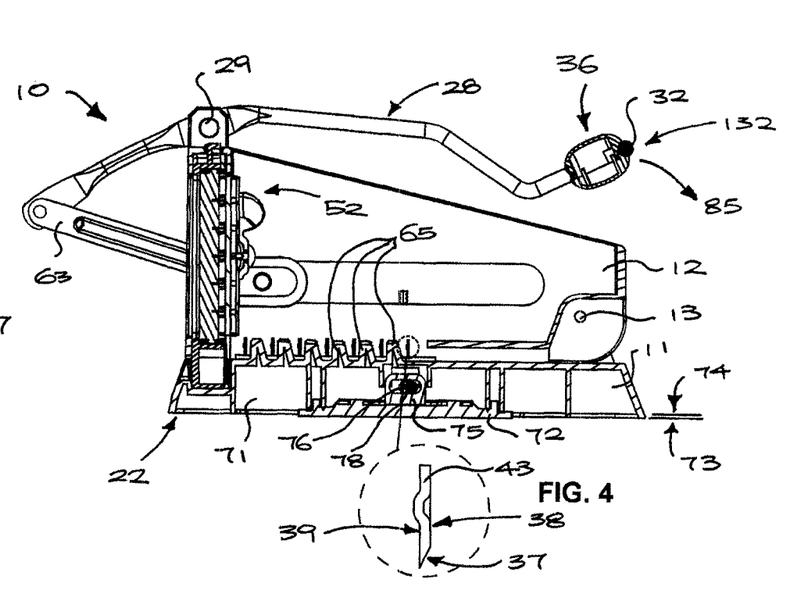
FIG. 4 is a section in plane AA of FIG. 2.
Figure 7:
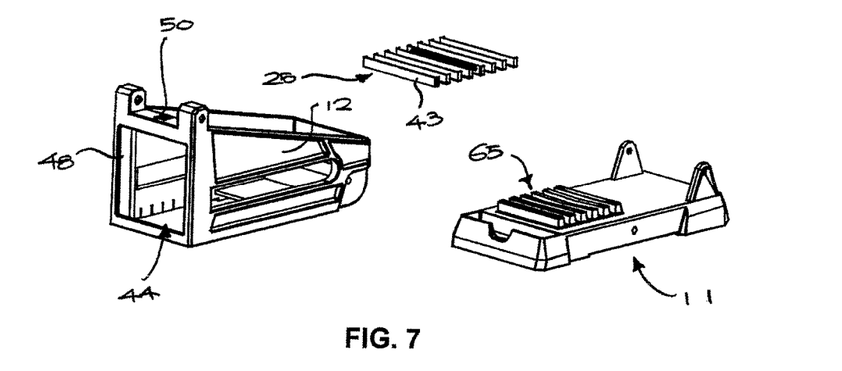
FIG. 7 is an exploded view of the base and frame of the culinary tool of FIG. 1.
Figure 8:
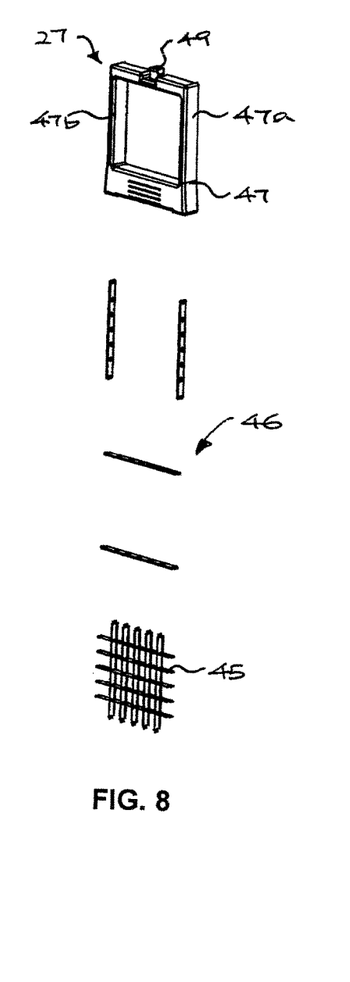
FIG. 8 is an exploded view of a second cutting grid of the culinary tool of FIG. 1.

The first and second cutting grids 26, 27 comprise arrays of parallel cutting edges. As best seen in FIGS. 2 and 3, in the first cutting grid 26 blades are aligned transversely, parallel to one another at a constant pitch to form an array of rectangular openings 40 that are elongated transversely. In the second cutting grid 27 two sets of blades at the same pitch are arranged crosswise to define an array of square openings 41. Referring to FIGS. 4, 7 and 8, the blades 43 of the first cutting grid 26 may be permanently fixed to the frame 12, with their cutting edges 37 lowermost, as in use they cut during downward travel. Relative to the hinge 13, the blades 43 may have inner and outer sides 38 and 39 respectively, and the inner side 38 may be concave and the outer side 39 convex, such that the blades are arcuate in cross section. The curvature of the blades 43 may vary proportionally to their spacing from the hinge 13. Opposing ends of the blades 43 may be fixed in slits 44 in the side walls 20, 21, or may be formed integrally with the frame 12, as by being moulded into the frame 12. The array of blades 45 of the second cutting grid 27 may be fixed to four perimeter bars 46, with the blades 45 and bars 46 permanently fixed in a rectangular chassis 47 to form a module that may be readily demounted from the frame 12, as for cleaning. To this end the rectangular chassis 47 has elongate, parallel edges 47a, 47b adapted to be slidingly received in a channel 48 in the frame 12. When this blade assembly is inserted all the way home, a clip 49 on the chassis projects onto an aperture 50 in the frame 12, to hold it in place.

Figure 9:
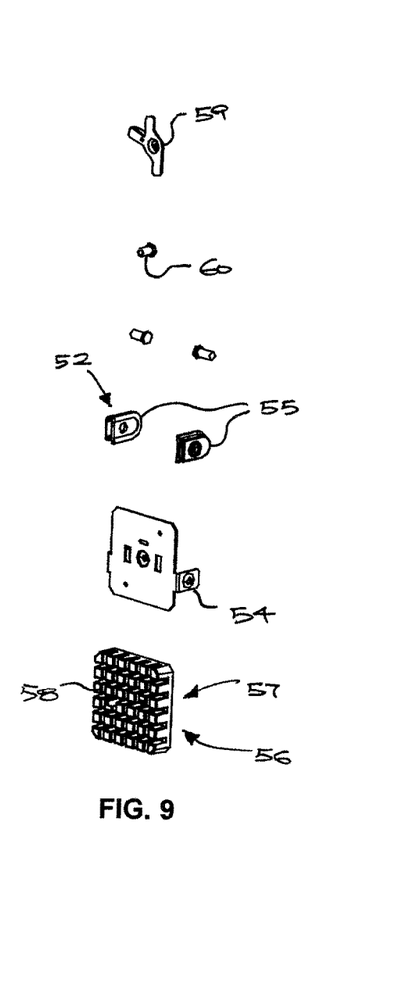
FIG. 9 is an exploded view of a pusher of the culinary tool of FIG. 1.
Figure 10:
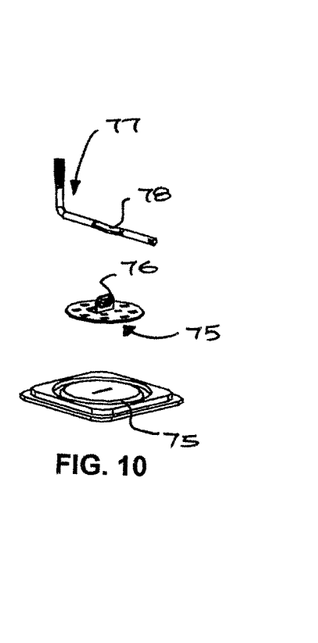
FIG. 10 is an exploded view of a suction cup assembly of the culinary tool of FIG. 1.

A pusher 52 is disposed the cavity 24 for displacement between the ends 22, 23 for pressing the food item 70 through the second cutting grid 27. The pusher 52 may be assembled from a mounting plate 53 having a pair of orthogonal flanges 54 to each of which a guide protrusion 55 is fixed, as by each flange 54 being received in cavity in one of the guide protrusions 55. A facing element 56 has one side 57 fixed to the mounting plate 53 and an opposite side the engages the food item and includes a rectangular array of fingers 58, each of which is square in cross section and so is complementary to the square openings 41 in the second cutting grid 27. To allow ready removal of the facing element 56, it is attached by a latch 59, fixed by a pin 60 to the mounting plate 53. Each sidewall may include a slot 61, the slots 61 being aligned longitudinally parallel to one another, such that each of the two guide protrusions 55 is received in a respective one of the slots 61 for guiding the displacement of the pusher 52.

Projecting upwardly from the surface 18 on the base 11 may be an array of parallel ribs 65, the tips of which may lie generally in a common plane to define a support surface 66 for supporting the item 70 to be cut.

Figure 11:
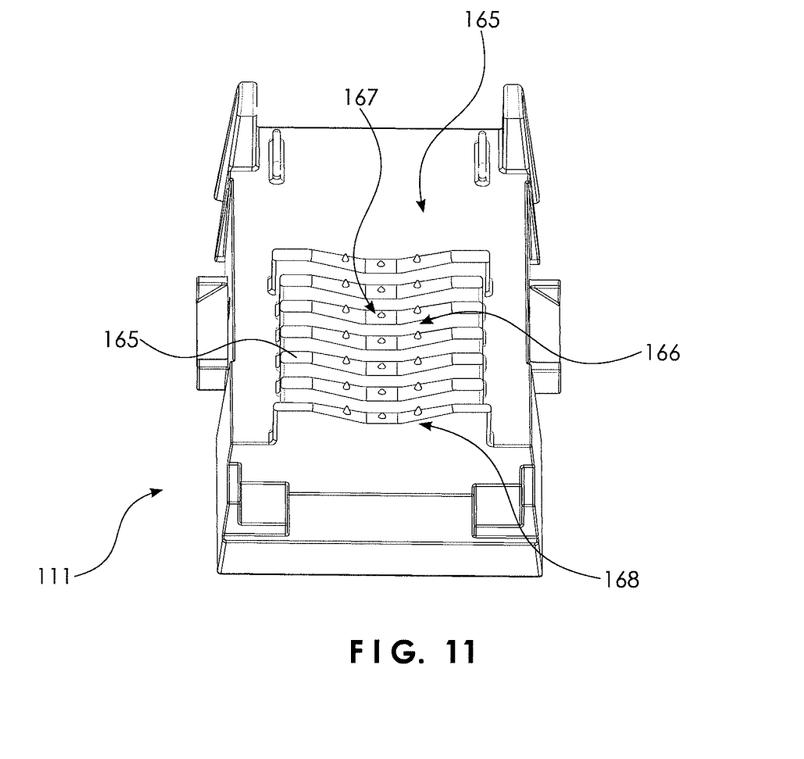
FIG. 11 is a perspective view of an alternative base of the culinary tool of the invention.

To assist in locating the item 70, the support surface 166, in an alternative embodiment of the base 111 shown in FIG. 11, may be concave. In this embodiment, each of the ribs 165 may have a tip with a like concave surface 168 facing upward, so that together, the ribs 165 define a channel extending longitudinally, centrally through the base 111. Furthermore, pins 166 may be formed on each of the ribs 165, particularly projecting from the concave surface 168. The concave support surface 166 thus formed helps locate the item to be cut in the desired central part of the base 11, while the pins 166 pierce a small distance into the item to help hold it in place.

A drive mechanism may comprise two links 63 pivotally fixed at their opposing ends to respective ones of the two guide protrusions 55 of the pusher 52 and respective ends of the shorter parts 28b of the handle 28. In this manner, pivoting of the handle 28 relative to the frame 12 drives the displacement of the pusher 52. Pivoting of the handle 28 relative to the frame 12 can also drive the turning of the frame 12 between the open and closed positions.

As seen in FIG. 4, the suction cup assembly 19 may be mounted in a recess 71 disposed approximately centrally in the base 11. The suction cup assembly 19 comprises a suction cup 72 having a peripheral face generally disposed in a cup plane 73 offset below a lowermost face 74 of the base 11. A block 75 fixed to a central part 78 of the suction cup includes a slot 76. A rotary actuator 77 includes an eccentric 78 received in the slot 76, which may be aligned parallel to the cup plane 73 such that rotation of the rotary actuator 77 displaces the central part 78 perpendicular to the cup plane 73.

In use, the culinary tool 10 may be placed on a smooth bench top, or the like, in its closed position (as shown in FIG. 4), and in this position the weight of the tool (and, optionally, a load applied by the user) presses the peripheral face of the suction cup 72 against the bench top. The user then turns the rotary actuator 77 to a generally horizontal actuated position (not shown) to raise the central part 78, creating a concavity between the bench top and the base 11 that is partially evacuated. A high static frictional force is thereby created between resilient material of the vacuum cup 73 and the bench top due to the weight being supplemented by atmospheric pressure, thus firmly holding the tool 10 in place. A dish 80 may be sat upon the bench top adjacent the end 22 ready to receive the food item 70 once it is diced.

With reference to FIGS. 4-6, grasping the handgrip 36, the user turns the handle 28 to move the handgrip 36 from position 132 (FIG. 4) to the position 232 (FIG. 5), in order:

i) to turn the frame 12 to its open position ready to receive the item 70, and ii) to move the pusher 52 to the end of its travel in the retraction direction.

The forward stroke of the handle 28 may be started from this position 232 of the handgrip 36 (FIG. 5) where the frame 12 is sufficiently rotated open to allow the item 70 to be inserted, and the pusher 52 is at the end of its travel in the retraction direction. The forward stroke of the handle 28 in forward direction 82 turns the frame 12 about the hinge 13 toward the base 11 to the closed position. At the end of the forward stroke the handle 28 is positioned with handgrip 36 in position 432 (FIG. 6) and, while the handle 28 has not turned relative to the frame 12, the frame 12 has turned relative to the base 11 and has thereby pressed the item 70 through the first cutting grid 26, cutting it into slices having a rectangular cross-section. The torque applied in this forward stroke also holds the pusher 52 is at the end of its travel in the retraction direction.

Optionally, the forward stroke of the handle 28 may be started from a position 332 of the handgrip 36 where the stop surfaces 15, 16 are abutting (and the pusher 52 is likewise at the end of its travel in the retraction direction). In the position 332 of the handgrip 36 the frame 12 is further opened to receive larger items and the handgrip 36 can be released, as the tool can remain stable in this position 132 without user input.

The reverse stroke of the handle 28 may be started from this position 432 of the handgrip 36 (FIG. 6) where the frame 12 is in its closed position, and the pusher 52 is at the end of its travel in the retraction direction. The reverse stroke of the handle 28 in reverse direction 83 moves the pusher 52 in the extension direction to the opposite ends of the cavity, pressing the item 70, now diced into cubes, through the second cutting grid 27 to drop into the dish 80. At the end of the forward stroke in direction 83 the handle 28 is once again positioned with handgrip 36 in position 132 (FIG. 4).

To move the handle 28 from the position 132 of the handgrip 36 (FIG. 4) to the position 232 (or 332) of the handgrip 36 (FIG. 5) it may be advantageous to continue the reverse movement of the handgrip 36 from the preceding step in two stages:

1) moving the handgrip 36 along arc 81, centred on hinge 13, to turn the frame 12 about the hinge 13, and then 2) turning the handle 28 about the pivot 29, thereby moving the pusher 52 from the end 22 toward the opposing end 23, until the pusher 52 reaches the end of its travel in the retraction direction.

This reverse movement need not be completed in two consecutive stages, as described above, and the reverse movement may follow a path such as to impel simultaneous rotation of the handle 28 relative to the frame 12 and of the frame 12 relative to the base 11. This allows a complete a cycle, via which an item is diced and the tool returned to its starting position, to be completed using only a forward followed by a reverse stroke.

The pivot 29 connecting the handle 28 to the frame 12 at the opposite end from the hinge 13 thus provides a significant mechanical advantage for turning the frame 12 about the hinge 13, since in position 232 the handgrip 36 is substantially offset from the axis of the hinge 13 (when closing the frame 12 to push the item through the first grid 26). Advantageously, the pivot 29 allows the movement of the handgrip 36 from position 432 to position 132 to have a susbstantial downward component. Also, this turning of the handle 28 down about the pivot 29, allows the handle 28 to placed in the position shown in FIG. 4, where the arm 28a projects a little above the top of the frame 12, providing a compact configuration for storage.

In the above-described method the item 70 is diced by pressing it consecutively through both of the cutting grids 26, 27, but of course the product can also be sliced by pressing it through only one of the grids 26, 27 if dicing is not required, grid 26 producing a rectangular cross section in the sliced item 70, and grid 27 producing a square cross section in the sliced item 70 (suitable for chips).

Aspects of the present invention have been described by way of example only and it should be appreciated that modifications and additions may be made thereto without departing from the scope thereof

The invention claimed is:

1. A culinary tool comprising:

a base having a support surface for supporting an item to be cut;

a frame defining a cavity having first and second opposing ends;

a hinge connecting the frame to the base for turning of the frame relative to the base between an open position in which the frame and base are spaced apart, and a closed position in which the frame rests on the base;

a first cutting grid disposed on the frame and opposed to the support surface and bounding the cavity, such that turning of the frame to the closed position can press the item through the first cutting grid into the cavity;

a second cutting grid on the frame at the first opposing end of the cavity;

a pusher attached to the frame for displacement between the first and second opposing ends of the cavity for pressing the item through the second cutting grid;

a pivot;

a handle pivotally connected by the pivot to the frame for movement through forward and reverse strokes of a single cycle;

a drive mechanism connecting the handle to the pusher, such that pivoting of the handle relative to the frame drives the displacement of the pusher and the turning of the frame between the open and closed positions, wherein the forward stroke turns the frame about the hinge toward the base while holding the pusher at the second opposing end of the cavity, pressing the item through the first cutting grid, and the reverse stroke moves the pusher to the first opposing end of the cavity, pressing the item through the second cutting grid.

2. The culinary tool of claim 1, wherein the cavity has a cavity opening opposite the first cutting grid.

3. The culinary tool of claim 2, wherein the frame comprises parallel, opposing first and second sidewalls elongated longitudinally and extending between the first and second opposing ends of the cavity.

4. The culinary tool of claim 3, wherein
each of the first and second sidewalls includes a respective slot,
the respective slots are aligned longitudinally,
the pusher has two protrusions, and
each protrusion is received in a respective one of the slots for guiding the displacement of the pusher.

5. The culinary tool of claim 4, wherein the drive mechanism comprises at least one link pivotally attached at opposing link ends to the pusher and to the handle.

6. The culinary tool of claim 5, wherein
the handle is elongate and includes
opposing first and second handle ends, and
a grip at the first handle end, and
the at least one link is pivotally attached to the second handle end.

7. The culinary tool of claim 6, wherein
the at least one link comprises a pair of links, and
each link is pivotally attached at a first link end to a respective one of the protrusions on the pusher, and fixed at a second link end to the handle.

8. The culinary tool of claim 6, wherein
the handle comprises a pair of arms,
the at least one link comprises a pair of like links,
the grip spans transversely between the arms,
the pivot comprises coaxial fasteners that connect intermediate parts of each arm to the frame, and
an end of each arm is pivotally attached to a respective one of the pair of like links.

9. The culinary tool of claim 8, wherein the hinge and the pivot are disposed at longitudinally opposing ends of the frame.

10. The culinary tool of claim 1, wherein the base has a recess and including a suction cup assembly mounted in the recess in the base for securing the culinary tool to a planar surface.

11. The culinary tool of claim 10, wherein the suction cup assembly comprises
a suction cup having a periphery disposed in a cup plane that is offset below a lowermost face of the base,
a slot fixed to a central part of the suction cup, and
a rotary actuator having an eccentric, wherein the eccentric is received in the slot, such that rotation of the rotary actuator displaces the central part of the suction cup perpendicular to the cup plane.

* * * * *